(12) United States Patent
Glas

(10) Patent No.: US 7,717,251 B2
(45) Date of Patent: May 18, 2010

(54) APPARATUS FOR THE CONVEYING OF SEPARATED GOODS

(75) Inventor: Franz Glas, Rott am Inn (DE)

(73) Assignee: ALPMA Alpenland Maschinenbau GmbH, Rott am Inn (DE)

( * ) Notice: Subject to any disclaimer, the term of this patent is extended or adjusted under 35 U.S.C. 154(b) by 105 days.

(21) Appl. No.: 12/082,384

(22) Filed: Apr. 9, 2008

(65) Prior Publication Data

US 2008/0251353 A1 Oct. 16, 2008

(30) Foreign Application Priority Data

Apr. 11, 2007 (DE) .................. 10 2007 017 035

(51) Int. Cl.
*B65G 47/30* (2006.01)

(52) U.S. Cl. .................. 198/448; 198/369.1; 198/458; 198/586; 198/601

(58) Field of Classification Search .................. 198/448, 198/458, 369.1, 369.7, 586, 601
See application file for complete search history.

(56) References Cited

U.S. PATENT DOCUMENTS

| | | | | |
|---|---|---|---|---|
| 4,056,186 A | * | 11/1977 | Hill | .............. 100/12 |
| 4,079,644 A | * | 3/1978 | Hoke et al. | .............. 83/88 |
| 4,440,289 A | * | 4/1984 | Weis | .............. 198/448 |
| 4,771,876 A | * | 9/1988 | Bandixen | .............. 198/367 |
| 4,999,578 A | * | 3/1991 | Ohashi et al. | .............. 324/754 |
| 5,209,339 A | | 5/1993 | Antonissen | |
| 5,421,446 A | * | 6/1995 | Koch et al. | .............. 198/369.7 |
| 5,810,149 A | * | 9/1998 | Sandberg et al. | .............. 198/369.2 |
| 6,209,194 B1 | * | 4/2001 | Kang et al. | .............. 29/739 |
| 7,380,650 B2 | * | 6/2008 | Gamberini | .............. 198/369.1 |
| 7,434,675 B1 | * | 10/2008 | Rohm et al. | .............. 198/346.2 |
| 2004/0079619 A1 | * | 4/2004 | Go et al. | .............. 198/414 |
| 2004/0159246 A1 | * | 8/2004 | Weber | .............. 99/443 C |
| 2009/0200141 A1 | * | 8/2009 | Noda et al. | .............. 198/586 |

FOREIGN PATENT DOCUMENTS

| | | |
|---|---|---|
| DE | 101 43 506 A1 | 9/2001 |
| JP | 02152815 A | 6/1990 |

* cited by examiner

*Primary Examiner*—Mark A Deuble
(74) *Attorney, Agent, or Firm*—Townsend and Townsend and Crew, LLP

(57) ABSTRACT

The invention relates to an apparatus for the conveying of homogenized products having an n-track conveying section and a single-track conveying section adjoining it, wherein at least n+1 individual conveyors extending parallel to one another in a conveying plane adjoin the end of the n-track conveying section.

31 Claims, 30 Drawing Sheets

APPARATUS FOR THE CONVEYING OF SEPARATED GOODS

BACKGROUND OF THE INVENTION

The invention relates to an apparatus for the conveying of separated goods using an n-track conveying section and a one-track conveying section adjoining it.

Such apparatus are in particular known from food technology and can serve to convey products from a cutting apparatus to a packaging machine. If the cutting apparatus is designed as a dual or four-fold slicer, the sliced products are supplied on two tracks or on four tracks. Since many packaging machines, in particular e.g. tubular bag machines, are only suitable to process products supplied on one track, it is necessary to provide suitable devices between the cutting apparatus and the packaging machine which combine the products supplied from the cutting apparatus on multiple tracks onto a single-track conveying section.

Such devices known from the prior art frequently have the disadvantage that the products have to be moved between different conveying planes, with slanted positions of the products occurring as a rule on the transfer of the products from one conveying plane into a conveying plane disposed thereabove or thereunder. This has the result that, for example, conveyed stacks of comparatively dry slices of cheese slip in an unwanted manner, with even the complete dissolution of conveyed stacks being able to occur, which in turn has the result that such products supplied in an unordered manner cannot be processed by a packaging machine. This then in turn causes an expensive reduction in the respective plant availability.

SUMMARY OF THE INVENTION

It is an object of the present invention to further develop an apparatus of the initially named kind such that the conveyed products can remain in a single conveying plane during the total conveying process, with slanted position of the products being substantially avoided, but preferably completely avoided. In particular a packaging machine should be able to be loaded continuously with products in accordance with the invention. The apparatus in accordance with the invention should also satisfy high hygienic demands.

The named objects are satisfied in accordance with the invention in that at least n+1 individual conveyors extending parallel to one another in a conveying plane adjoin the end of the n-track conveying section; in that the individual conveyors can be driven independently of one another in the conveying direction; and in that the individual conveyors can be moved at right angles to the conveying direction in the conveying plane.

Such an apparatus makes it possible for the n-track conveying section to load n parallel, adjacent individual conveyors with products simultaneously so that the loaded single conveyors can then transfer the respective products located on them sequentially to the single-track conveying section after they have been moved into a transfer position in each case at right angles to the conveying direction in the conveying plane. The delivery of the products from the individual conveyors to the single-track conveying section takes place such that the products of an outer individual conveyor are transferred last, which has the effect that, when the products are delivered from this outer individual conveyor, n adjacent individual conveyors are already again ready for the reception of new products. Such a reception of products from the n-track conveying section can then also already take place in accordance with the invention while products are still being transferred from the named outer individual conveyor to the single-track conveying section.

In this manner, it therefore becomes possible in accordance with the invention to supply the single-track conveying section with products practically continuously since products can still be supplied from an outer individual conveyor to the single-track conveying section even on a delivery of products from the n-track conveying section to the individual conveyors.

When the n-track conveying section and the single-track conveying section and also the individual conveyors extend in a common conveying plane, it is ensured in an extremely advantageous manner that the products do not have to leave the common conveying plane of the n-track conveying section, the individual conveyors and the single-track conveying section at any time so that slanted positions of the products as well as accelerations acting on the products with a vertical component are completely avoided in the ideal case. If then the n-track conveying section, the individual conveyors and the single-track conveying section are operated with gentle acceleration ramps, it can be achieved in accordance with the invention that individual slices of transported stacks of products do not slide relative to one another so that ultimately only further processable and cleanly aligned products stacks can be made available to a packaging machine.

The invention, however, also includes those embodiments, albeit less advantageous embodiments, in which the n-track conveying section, the single-track conveying section and/or the individual conveyors extend inclined slightly with respect to one another.

In the operation of the apparatus in accordance with the invention, all the products of an individual conveyor are preferably first transferred to the single-track conveying section before the products of a further individual conveyor are transferred. The individual conveyors are thus each completely emptied sequentially in time.

The n-track conveyor section has at least two tracks, but can also have any desired higher number of tracks. Two-track, three-track or four-track conveying sections are preferably used since currently cutting apparatus are available which deliver the products in two, three or four tracks. If, however, cutting apparatus should be used which can deliver products in more than four tracks, the invention can also be likely used in conjunction with such cutting apparatus.

Each individual conveyor provided in accordance with the invention is configured for the reception of at least two separated products, in particular m separated products, where a value can be selected for m, e.g. between 2 and 9. The products are accordingly transferred from the n-track conveying section in sequel batches in each case in the form of a matrix to the n adjacent individual conveyors, with the length of the matrix in the conveying direction amounting to m and the width of the matrix at right angles to the conveying direction amounting to n.

All the individual conveyors are preferably movable together at right angles to the conveying direction in the conveying plane. It is thus achieved that that individual conveyor can always be aligned with the following single-track conveying section whose products should be transferred next. Since all the individual conveyors can only be moved together, the apparatus effort to be carried out in the realization of the invention can be reduced in that only single drive has to be provided for the moving of the individual conveyors.

In particular an at least n-track intermediate conveyor is arranged between the n+1 parallel individual conveyors and the n-track conveying section and can be moved—as also the individual conveyors—at right angles to the conveying direction in the conveying plane. This intermediate conveyor is preferably configured for the reception of n*m separated products. The intermediate conveyor is thus in a position to take over a complete batch from the n-track conveying section in the form of a product matrix of the size n*m in order to pass the batch to n adjacent individual conveyors. The movability of the intermediate conveyor in the conveying direction makes it possible in this context to align it to the individual conveyors in the transfer process of the products such that the complete product matrix can in each case be simultaneously transferred to those individual conveyors which are no longer active in the delivery of products to the single-track conveying section following the individual conveyors. The provision of the intermediate conveyor thus makes it possible to design both that region of the n-track conveying section arranged before the intermediate conveyor in the conveying direction and the single-track conveying section such that it is in each case fixed at right angles to the conveying direction and thus does not have to be moved in that direction in any transfer processes. Only the n+1 individual conveyors and the intermediate conveyor are moved at right angles to the conveying direction. This will be explained in more detail within the framework of the description of the Figures.

The single-track conveying section preferably consists of a plurality of mutually adjoining conveying segments which can be driven at mutually different conveying speeds. It is achieved in a known manner by this measure that products transferred to the single-track conveying section can be homogenized with respect to their mutual spacing. In addition—likewise in a known manner—buffer functions can be realized in this manner in the region of the single-track conveying section.

In a preferred embodiment of the invention, two single-track conveying sections can also follow the multi-track conveying section instead of an individual single-track conveying section. In this manner, using the principle in accordance with the invention, two packaging machines can be loaded simultaneously via a respective single-track conveying section so that the throughput can be correspondingly increased here. It is furthermore achieved that one of the packaging machines can continue to be loaded via the multi-track conveying section when the other packaging machine is standing still, for example due to servicing work.

Respective n+1 parallel individual conveyors and also a respective n-track intermediate conveyor are preferably associated with each single-track conveying section.

It is particularly preferred for the apparatus in accordance with the invention to be designed such that it cannot only process products supplied from a cutting apparatus in n tracks, but such that a processing of products is also made possible which are supplied from the cutting apparatus in fewer than n tracks. In this connection, it is particularly preferred for the apparatus in accordance with the invention generally to be designed for the processing of products supplied on four tracks, but to be in a position also to process products supplied on two tracks and/or three tracks so that, for example, as required, dual, three-fold or four-fold slicers can be used as cutting devices.

To achieve the last-named goal with respect to the selective use of a dual or four-fold slicer, the n-track conveying section can be made as a four-track conveying section whose start consists of two two-track conveyors which extend parallel to one another in the conveying plane, which can be driven independently of one another in the conveying direction and which can be moved at right angles to the conveying direction in the conveying plane. Both two-track conveyors can in particular be moved together at right angles to the conveying direction in the conveying plane. The operation of such an arrangement will be explained in even more detail within the framework of the description of the Figures.

If a three-fold slicer or a four-fold slicer should selectively be used, the two variants in accordance with the invention named in the following are possible:

In accordance with a first variant, the n-track conveying section is made as a four-track conveying section whose start consists of two two-track conveyors extending parallel to one another in the conveying plane and two single-track conveyors extending parallel thereto in the conveying plane which can all be driven independently of one another in the conveying direction and which can be moved at right angles to the conveying direction in the conveying plane. The two single-track conveyors are preferably located between the two two-track conveyors. The two two-track conveyors and the two single-track conveyors can be movable together at right angles to the conveying direction in the conveying plane. In the operation of this first variant, products are first moved onto the left-hand two-track conveyor and onto the left-hand single-track conveyor on three tracks, whereupon the two two-track conveyors and the two single-track conveyors are subsequently moved at right angles to the conveying direction such that further products can be moved, likewise on three tracks, onto the right-hand two-track conveyor and onto the right-hand single-track conveyor. Products are then subsequently transported away on four tracks from the right-hand two-track conveyor and the two single-track conveyors so that only products arranged in two tracks remain on the left-hand two-track conveyor. After this, products are then again moved on three tracks onto the two single-track conveyors and onto the inner track of the right-hand two-track conveyor. Subsequently, products are transported away on four tracks from the left-hand two-track conveyor and the two single-track conveyors so that products only remain on the inner track of the right-hand two-track conveyors. After this, products are moved on three tracks onto the two single-track conveyors and onto the inner track of the left-hand two-track conveyor so that products are located on four tracks on the two inner tracks of the two-track conveyor and on the two single-track conveyors and can then be transported away on four tracks. Subsequently, both two-track conveyors and both single-track conveyors are free of products so that the described process can be started again.

In accordance with a second variant, the n-track conveying section is likewise made as a four-track conveying section whose start now, however, consists of one three-track conveyor extending in the conveying plane and three single-track conveyors extending parallel thereto in the conveying plane which can all be driven independently of one another in the conveying direction and which can be moved at right angles to the conveying direction in the conveying plane. The three single-track conveyors are preferably all only arranged next to one another on one side of the three-track conveyor. The three-track conveyor and the three single-track conveyors can preferably be movable together at right angles to the conveying direction in the conveying plane.

The precise function of the last-named variant will likewise still be explained in more detail within the framework of the description of the Figures. Both variants can also be used for the processing of products supplied on two tracks (see e.g. FIGS. 12-15).

In addition to the described apparatus, the invention also relates to a method for the operation of such an apparatus.

Particularly preferred embodiments of the apparatus in accordance with the invention and of the method in accordance with the invention are described in the dependent claims.

BRIEF DESCRIPTION OF THE DRAWINGS

The invention will be described in more detail in the following with reference to embodiments and to the drawings.

DESCRIPTION OF THE PREFERRED EMBODIMENTS

Figure 1:
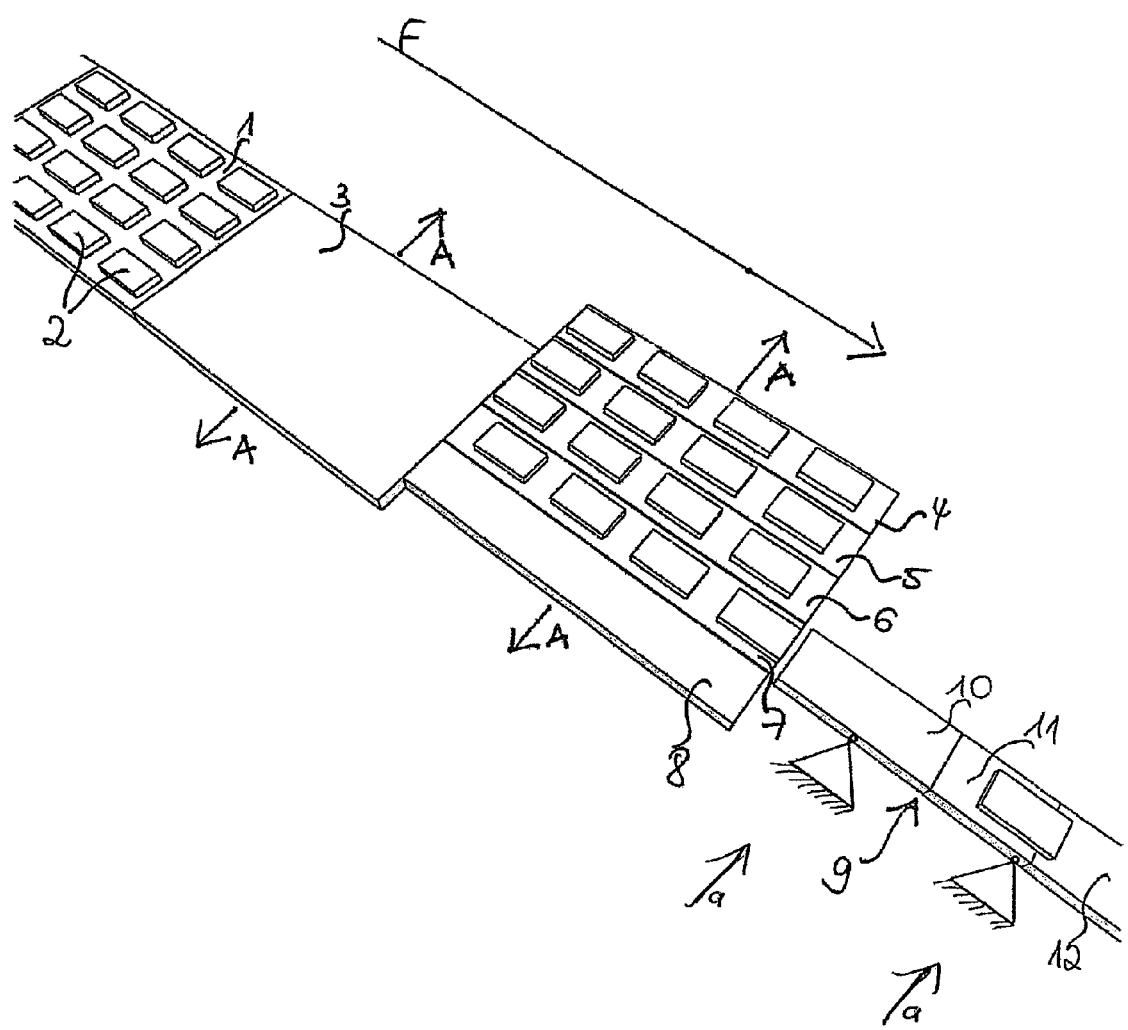
FIGS. 1 to 11 in each case are a schematic oblique view of an apparatus in accordance with the invention in different operating states.

FIG. 1 shows an n-track conveying section which is here concretely made as a four-track conveying section 1 (n=4). As can be seen from FIG. 1, there is room for four tracks of products 2 on the four-track conveying section, the tracks being arranged parallel to one another.

A likewise four-track intermediate conveyor 3 whose width corresponds to the four-track conveying section 1 is adjacent to the four-track conveying section 1. There is thus room on the intermediate conveyor 3 for just as many product tracks as on the four-track conveying section 1.

A total of five (n+1) individual conveyors 4 to 8 are adjacent to the intermediate conveyor 3 of which each is configured for the reception of one product track in each case. The individual conveyors 4 to 8 extend parallel to one another such that four individual conveyors 4 to 8 arranged next to one another have the same width as the intermediate conveyor 3 or the four-track conveyor section 1.

A single-track conveying section 9 is adjacent to the individual conveyors 4 to 8 and three conveying segments 10, 11, 12 of this can be seen in FIG. 1 which adjoin one another and which can be driven at conveying speeds differing from one another for the already named reasons.

The four-track conveying section 1, the intermediate conveyor 3, the individual conveyors 4 to 8 and the conveying segments 10 to 12 of the single-track conveying section 9 are arranged such that their transport surfaces extend within a single common plane for the avoidance of any slanted positions of the products 2, with the conveying direction F extending in the same direction with all named components.

The four-track conveying section 1 and the single-track conveying section 9 are fixed at right angles to the conveying direction F, which means that they cannot be displaced at right angles to the conveying direction in the conveying plane. The intermediate conveyor 3 and the individual conveyors 4 to 8 are, in contrast, movable at right angles to the conveying direction F in the conveying plane as is indicated by the arrows A in FIG. 1. The individual conveyors 4 to 8 can always only be moved together, which means that their relative position to one another never varies in the direction of the arrows A.

FIG. 1 shows an operating state in which four parallel tracks of products 2 are supplied via the four-track conveying section 1, with the intermediate conveyor 3 being free of products. Four respective products are located on the individual conveyors 4 to 7 and are thus ready for transfer to the conveying segment 10 of the single-track conveying section 9. In FIG. 1, the individual conveyor 7 is positioned such that it is aligned with the conveyor segment 10 such that the four products located on it can be transferred sequentially to the conveying segment 10.

While these products of the individual conveyor 7 are being transferred to the conveying segment 10, sixteen products 2 are transferred by the four-track conveying section 1 to the intermediate conveyor 3 in a four-track formation. In this connection, the four-track conveying section 1 is aligned with the intermediate conveyor 3, as is shown in FIG. 1.

Figure 2:
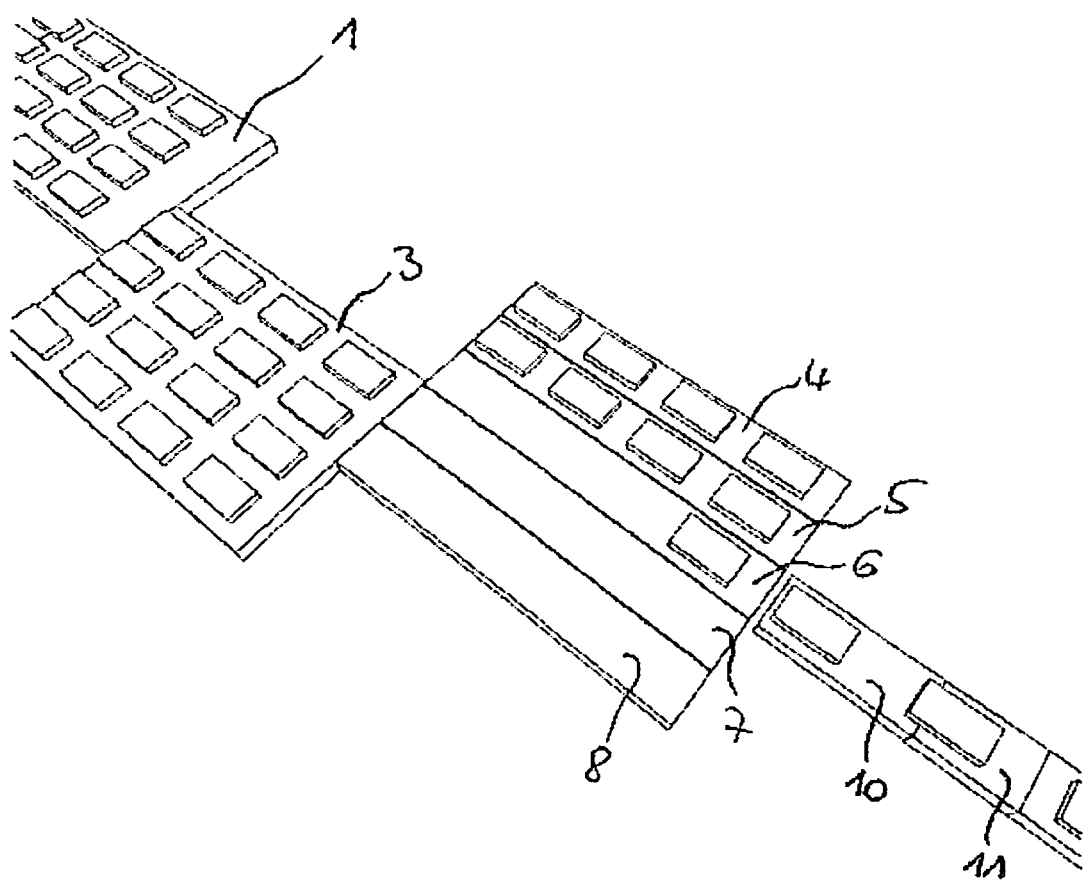

After all the products have been transferred from the individual conveyor 7 to the conveyor segment 10, the individual conveyors 4 to 8 are displaced at right angles to the conveying direction F such that now the individual conveyor 6 is aligned with the conveying segment 10 so that the products of the individual conveyor 6 can be transferred to the conveying segment 10 in this position. This position is shown in FIG. 2. In accordance with FIG. 2, three products have already been transferred from the individual conveyor 6 to the conveying segment 10; one product is still located on the individual conveyor 6.

While the individual conveyors 4 to 8 are displaced at right angles to the conveying direction F, no transfer of products 2 to the conveying segment 10 can take place so that a slightly enlarged spacing arises here between adjacent products of the conveying segment 10. This enlarged spacing can, however, subsequently be reduced again by the drive of the conveying segments 10 to 12 and possibly of further conveying segments, which are not shown, taking place at variable speeds, and can be adapted to the other product spacings.

Figure 5:
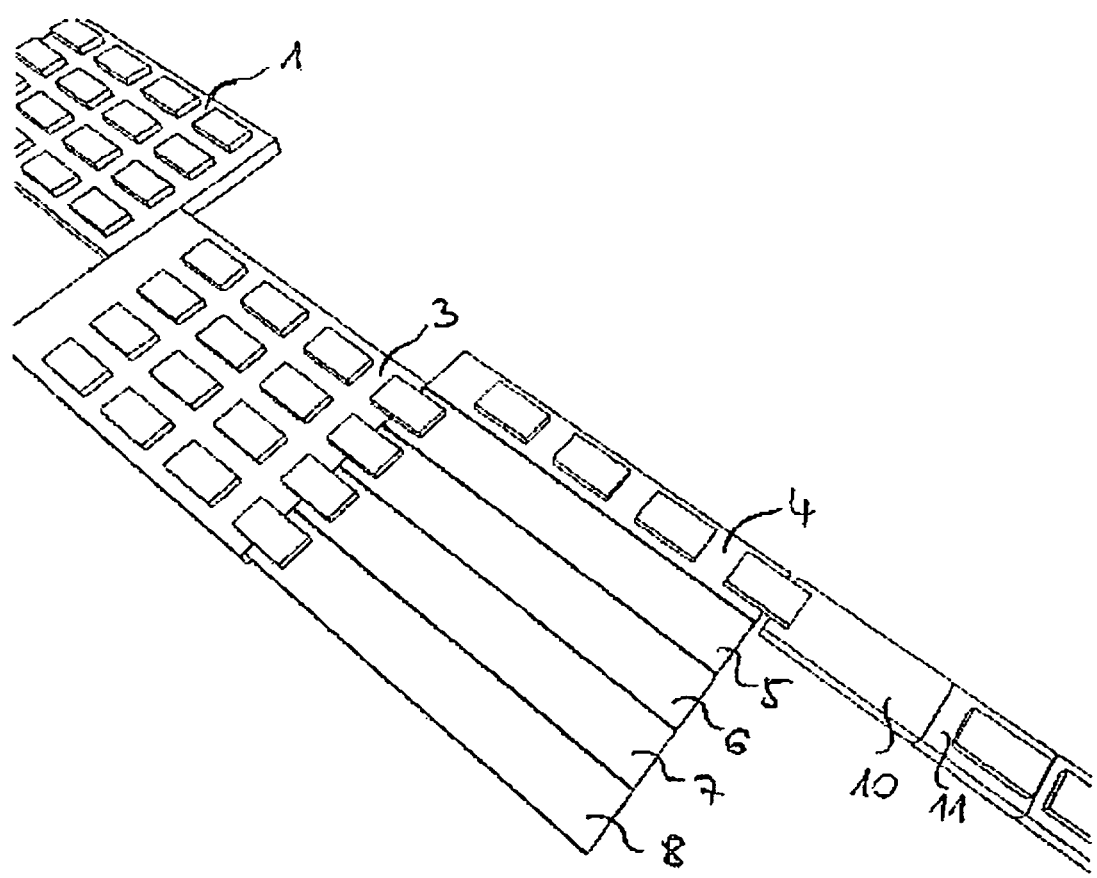

Furthermore, in accordance with FIG. 2, the intermediate conveyor 3 now loaded with sixteen products has been displaced at right angles to the conveying direction such that it will be aligned with the individual conveyors 5 to 8 when the outer individual conveyor 4 is in alignment with the conveying segment 10 (see FIG. 5).

Figure 3:
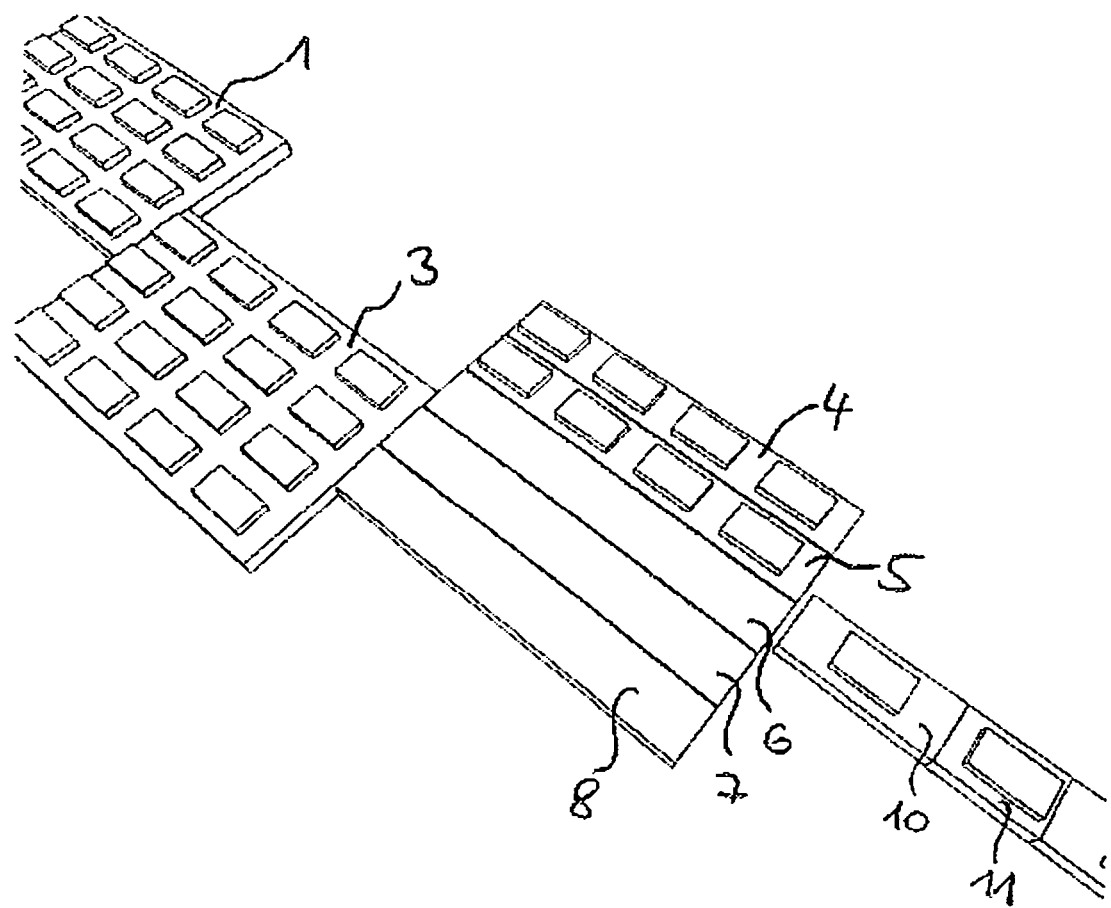
Figure 4:
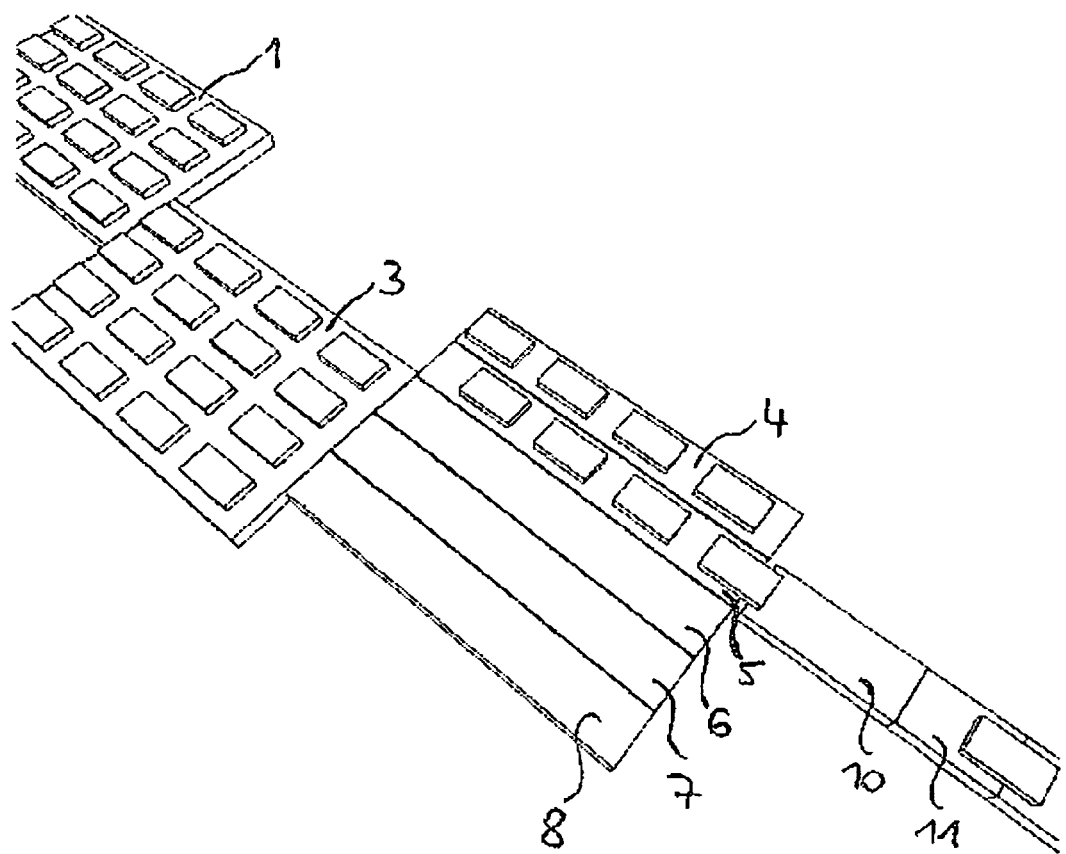

After all the products of the individual conveyor 6 have been transferred to the conveying segment 10, the individual conveyors 4 to 8 are moved at right angles to the conveying direction such that the individual conveyor 5 is aligned with the conveying segment 10. FIG. 3 shows an operating state in which the individual conveyors 4 to 8 are just being moved from their position in accordance with FIG. 2 into their position in accordance with FIG. 4. FIG. 4 then shows that position in which the product delivery from the individual conveyor 5 to the conveying segment 10 has already started. The intermediate conveyor 3 is located in an unchanged manner in its position in accordance with FIG. 2.

In accordance with FIG. 4, after all the products have been transferred from the intermediate conveyor 5 to the conveying segment 10, the individual conveyors 4 to 8 are moved at right angles to the conveying direction until the outermost individual conveyor 4 is located opposite the conveyor segment 10, as is shown in FIG. 5. In this position—as already mentioned—the intermediate conveyor 3 is simultaneously aligned with the now empty individual conveyors 5 to 8.

Figure 6:
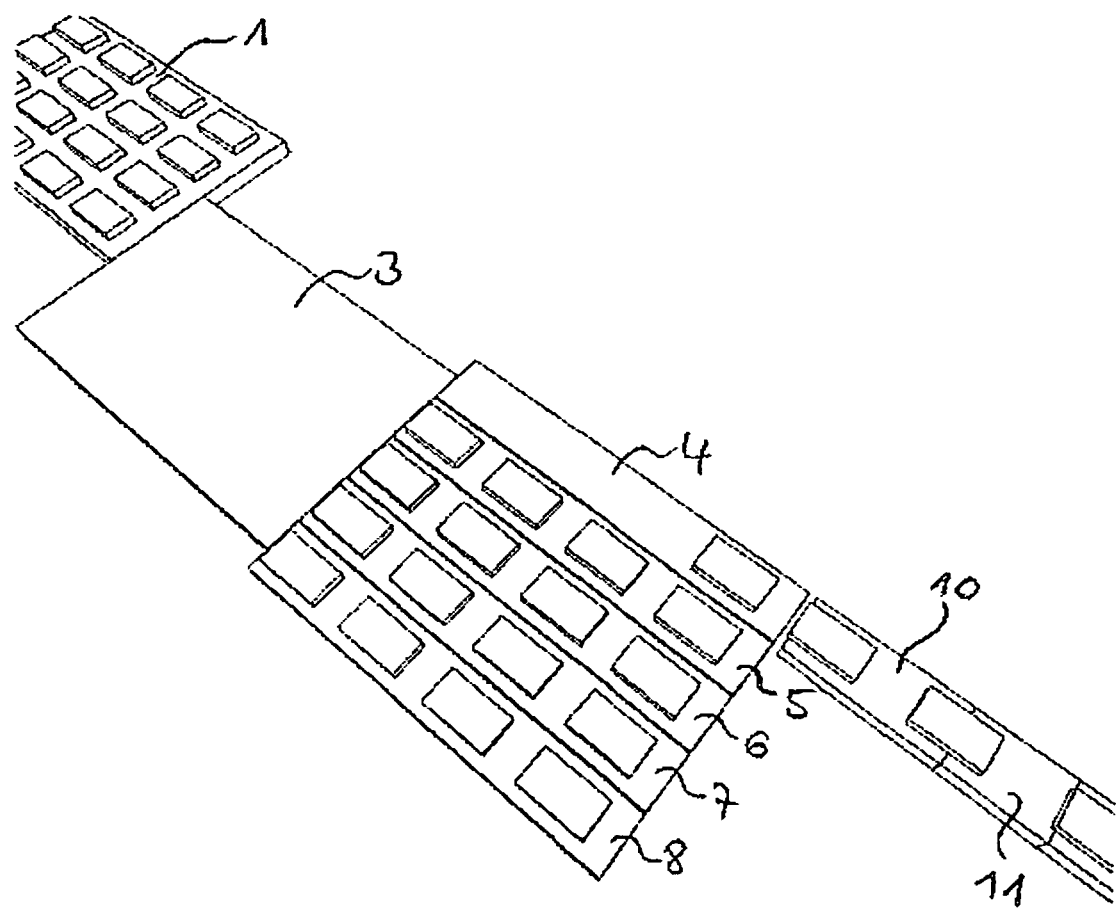

While the four products are transferred from the outer individual conveyor 4 to the conveying segment 10, a transfer of the sixteen products placed on the intermediate conveyor 3 already simultaneously takes place to the now emptied individual conveyors 5 to 8. This process can be seen from FIGS. 5 and 6.

Figure 7:
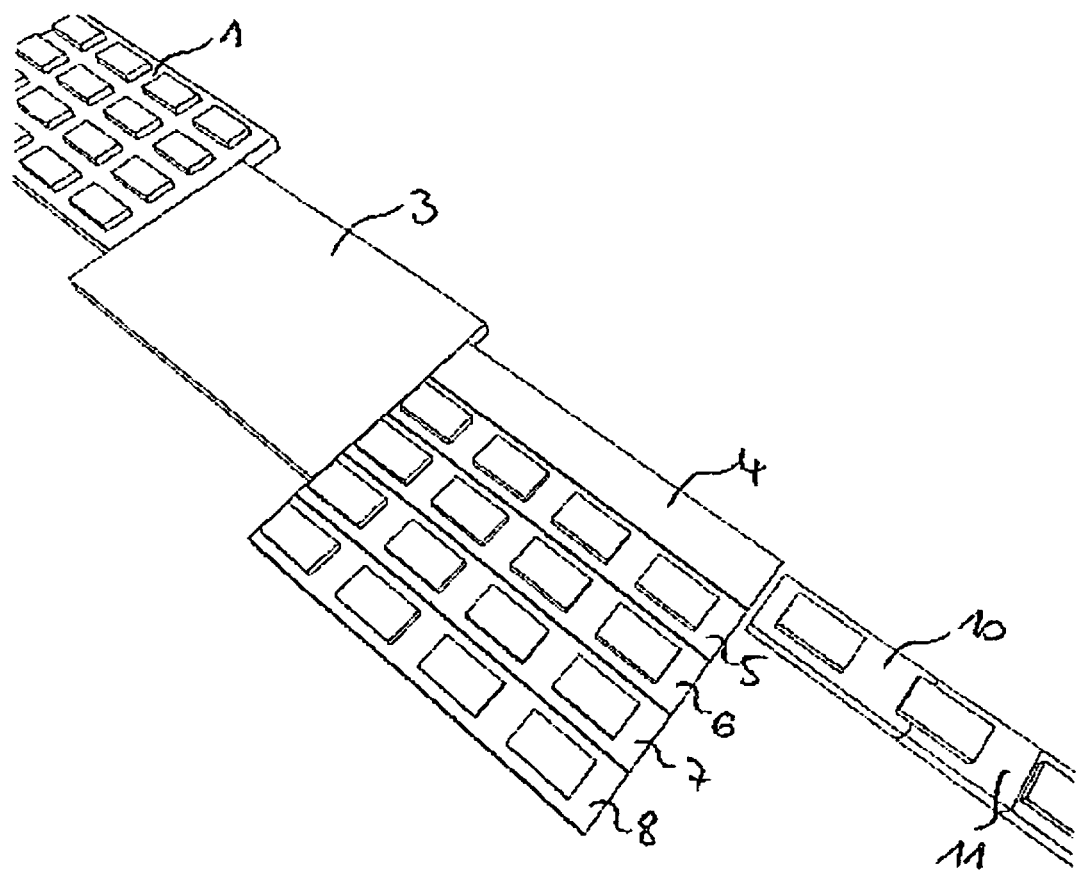
Figure 8:
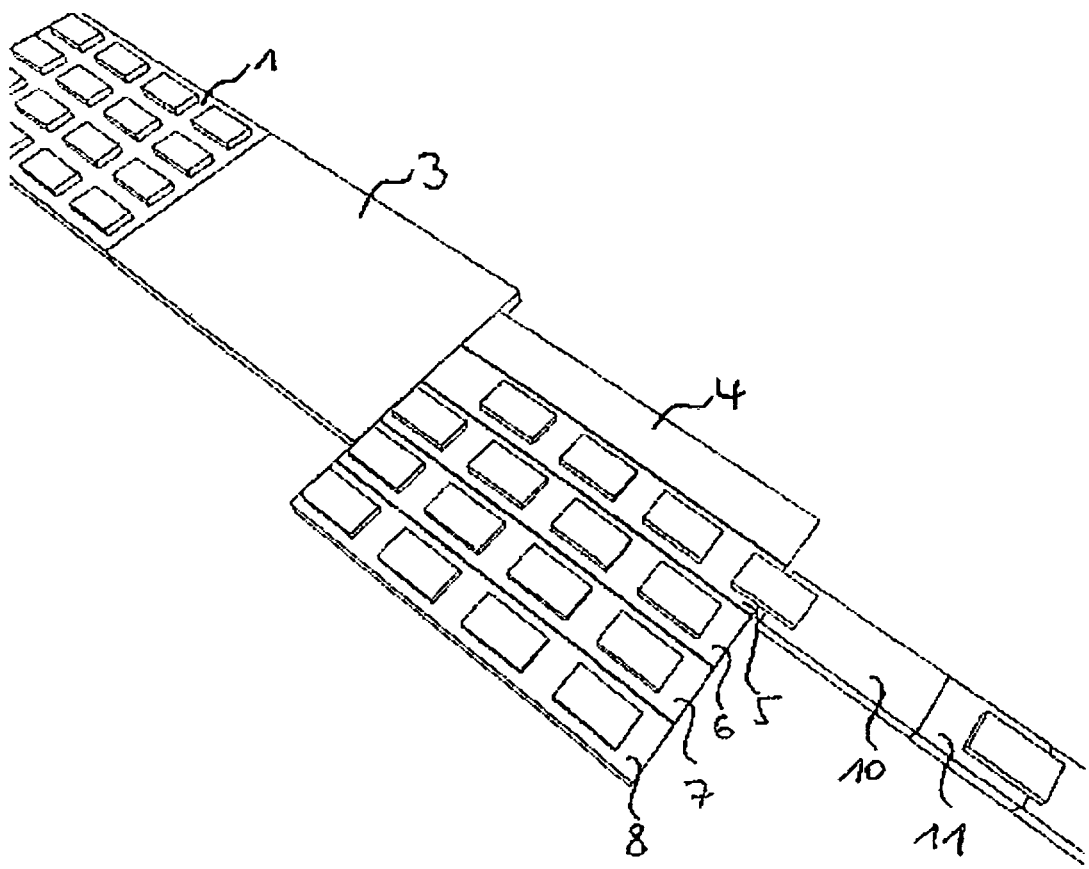

FIG. 7 shows an operating stage in which all the products of the individual conveyor 4 have been transmitted to the conveying segment 10, with the transfer of the sixteen products from the intermediate conveyor 3 to the individual conveyors to 8 also taking place simultaneously. Subsequently hereto, the individual conveyors 4 to 8 are then moved at right angles to the conveying direction into a position in which the individual conveyor 5 is aligned with the conveying segment 10. This position is shown in FIG. 8. FIG. 7 shows a position in which the movement of the individual conveyors 4 to 8 at right angles to the conveying direction has just started. In addition, FIG. 7 shows that a movement of the now emptied intermediate conveyor 3 has also again been triggered into a position in which it is then ultimately aligned with the four-track conveying section 1. This position of the intermediate conveyor 3 is then achieved in accordance with FIG. 8, with a delivery of products from the individual conveyor 5 to the conveying segment 10 simultaneously taking place. In its position in accordance with FIG. 8, the intermediate conveyor 3 is again ready to receive sixteen products from the four-track conveying section 1.

Figure 9:
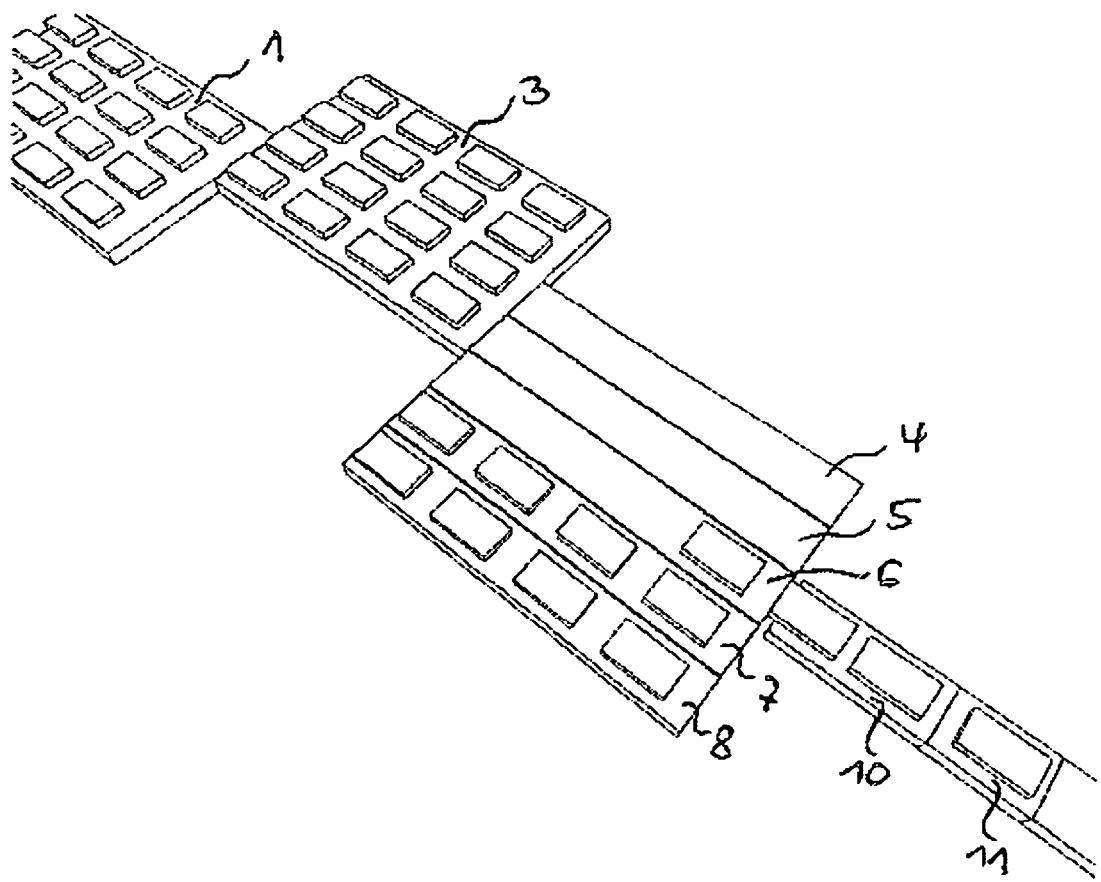

After this receiving has taken place, the intermediate conveyor 3 loaded with sixteen products is moved into a position at right angles to the conveying direction in accordance with FIG. 9. In this position, the intermediate conveyor 3 is ultimately aligned with the individual conveyors 4 to 7 when the individual conveyor 8 is aligned with the conveyor segment 10 (see FIG. 10).

In accordance with FIG. 9, the individual conveyors 4 to 8 are moved at right angles to the conveying direction after the complete emptying of the individual conveyor 5 in a manner such that the individual conveyor 6 is now aligned with the conveying segment 10 such that the products located on the individual conveyor 6 can now be transferred. After the end of this transfer, the individual conveyors 4 to 8 are again moved at right angles to the conveying direction such that the products of the individual conveyor 7 can be transferred to the conveying segment 10. A repeat movement of the individual conveyors 4 to 8 subsequently takes place such that now the other outer individual conveyor 8 disposed opposite the outer individual conveyor 8 is aligned with the conveying segment 10. This position is shown in FIG. 10.

Figure 10:
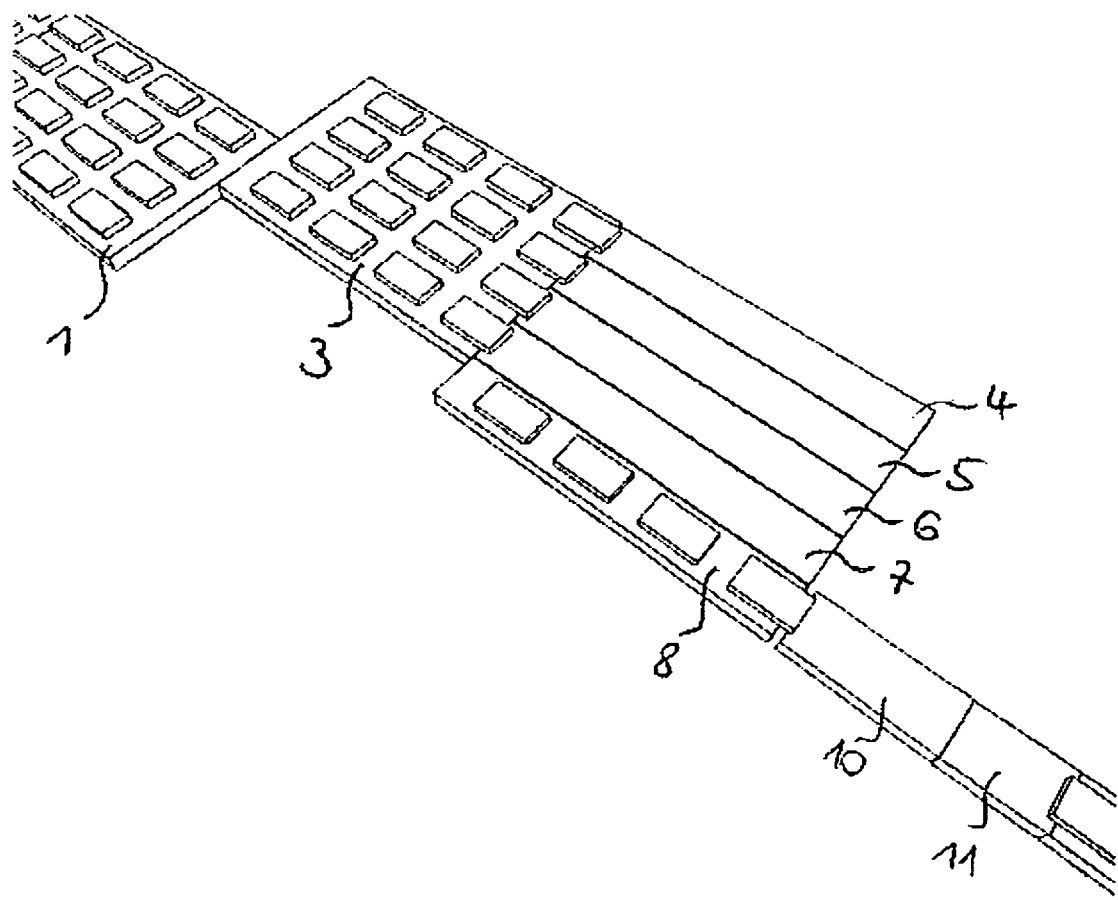

In accordance with FIG. 10, the four products of the outer individual conveyor 8 are transferred to the conveying segment 10, while simultaneously the individual conveyors 4 to 7 are loaded with a total of sixteen products by the intermediate conveyor 3.

Figure 11:
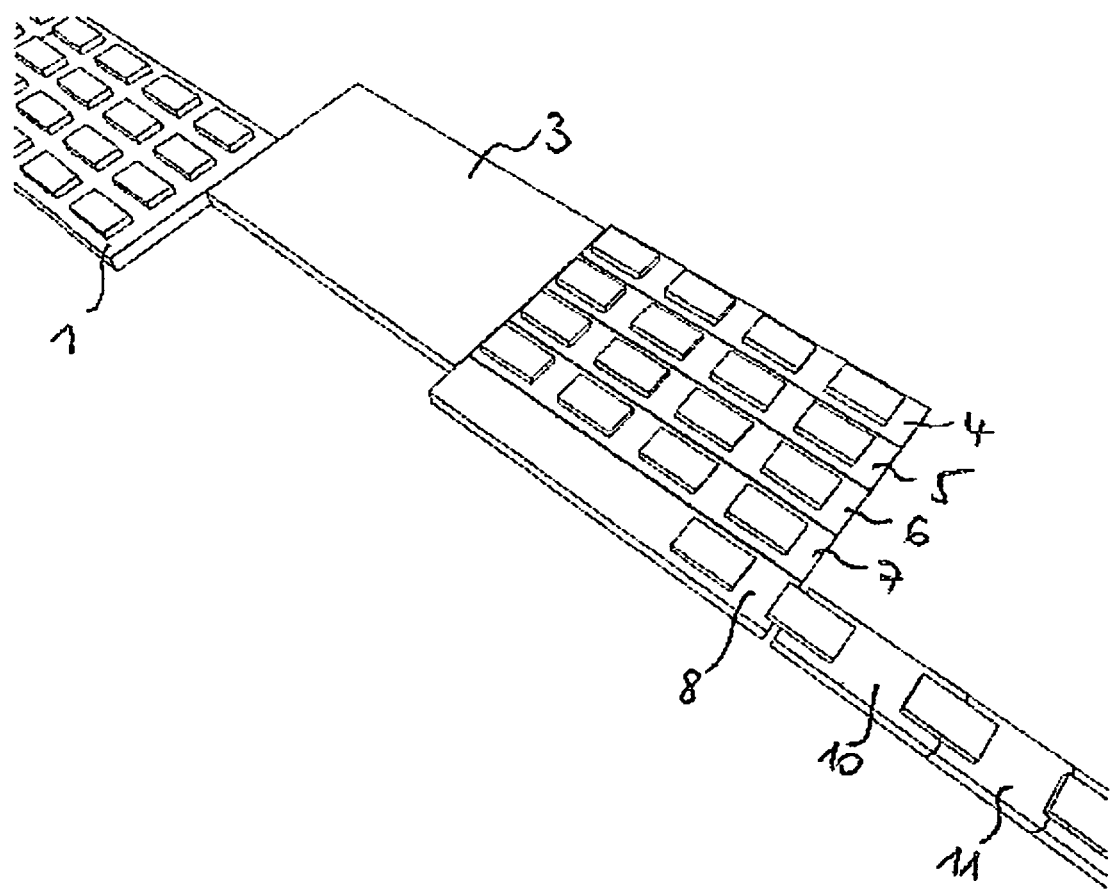

FIG. 11 shows an operating position in which all sixteen products have been transferred from the intermediate conveyor 3 to the individual conveyors 4 to 7 and the delivery of products from the individual conveyor 8 to the conveying segment 10 has not yet been completely finished.

If then, in accordance with FIG. 11, all the products of the individual conveyor 8 have been transferred to the conveying segment 10, the individual conveyors 4 to 8 are again moved at right angles to the conveying direction such that the individual conveyor 7 is located opposite the conveyor segment 10, with the empty intermediate conveyor 3 simultaneously again being able to be aligned with the four-track conveyor segment 1, as is shown in FIG. 1. The procedure described in connection with FIGS. 1 to 11 can then subsequently be repeated as often as desired.

Since, in accordance with the invention, the totality of the individual conveyors 4 to 8 have one track more than the four-track conveying section 1 and the intermediate conveyor 3, it is achieved that a delivery of products can take place from the individual conveyors 4 to 8 to the conveying segment 10 practically constantly (with the exception of brief pauses on the movement of the individual conveyors 4 to 8 perpendicular to the direction of conveying), and indeed also when the individual conveyors 4 to 7 or 5 to 8 respectively are again loaded with new products from the intermediate conveyor 3. Only brief transfer pauses arise during those times during which the individual conveyors 4 to 8 are moved perpendicular to the direction of conveying. This pausing can, however, again be compensated by a corresponding drive of the conveying segments 10 to 12 of the single-track conveying segment 9 such that all the products disposed on the single-track conveying segment 9 ultimately have the same spacings among one another.

It is also possible within the framework of the invention to provide an arrangement of individual conveyors 4 to 8 whose number exceeds the number of the tracks of the multi-track conveying segment by more than 1. Such excessive individual conveyors can then remain inactive on the carrying out of the method in accordance with the invention.

Figure 12:
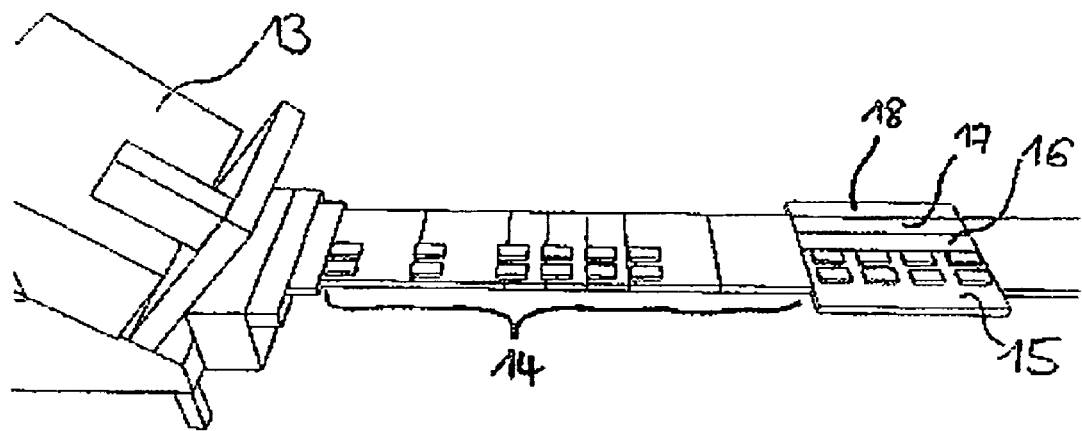
FIGS. 12 to 15 in each case are a schematic oblique view of a region of a four-track conveying segment in different operating positions which is suitable to convert a two-track conveying into a four-track conveying.

FIG. 12 shows a dual slicer 13 which is suitable to slice two product bars simultaneously and accordingly to provide two tracks of stacked slices. These two tracks of products are conveyed on two tracks along a conveying section 14.

A three-track conveyor 15 as well as three single-track conveyors 16 to 18 adjoin the conveying section 14 in the direction of conveying, with the three-track conveyor 15 and the single-track conveyors 16 to 18 being arranged parallel next to one another. All three single-track conveyors 16 to 18 are located on the side of the three-track conveyor at the left seen in the conveying direction.

Instead of the three-track conveyor 15 and the two single-track conveyors 16, 17, a two-track conveyor could also be used in each case for the method described in the following. The embodiment shown in FIG. 12 with a three-track conveyor 15 and three single-track conveyors 16 to 18 was selected because it is additionally suited to convert products supplied on three tracks to products supplied on four tracks, which will be described in the following with reference to FIGS. 16 to 22. In the method now described in conjunction with FIGS. 12 to 15, the single-track conveyors 16 and 17 are always driven synchronously with one another such that they ultimately have the same effect as a two-track conveyor. The single-track conveyor 18, just like the outermost track of the three-track conveyor 15, does not take over any function in the method in accordance with FIGS. 12 to 15.

FIG. 12 shows an operating state in which a total of eight products are transferred to the three-track conveyor 15 in two tracks from the conveying section 14.

To be able now to generate a four-track conveying procedure, the unit of three-track conveyor 15 and individual conveyors 16 to 18 are moved at right angles to the conveying direction such that the single-track conveyors 16, 17 are located aligned with the two tracks of products delivered by the slicer 13. In this position shown in FIG. 13, eight products can be transferred to the individual conveyors 16, 17 in two tracks, while the eight products previously already moved onto the three-track conveyor 15 remain there.

Figure 14:
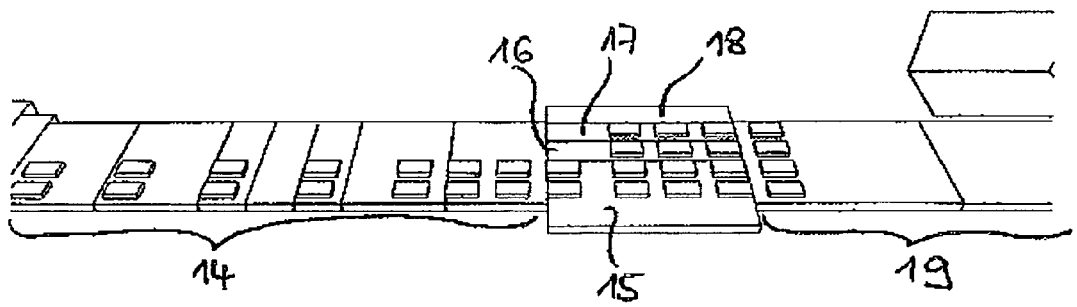
Figure 15:
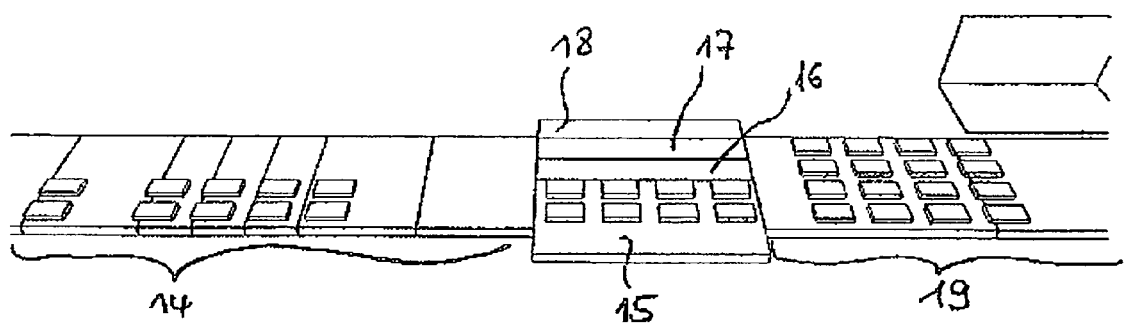

After a respective four products have been transferred from the conveying section 14 to the single-track conveyors 16, 17, the individual conveyors 16 to 18 and the three-track conveyor 15 are moved together at right angles to the conveying direction such that the four product tracks now located on the three-track conveyor 15 and single-track conveyors 16, 17 come to lie in alignment with a four-track conveying section 19. This position is shown in FIG. 14. In accordance with FIG. 14, the transfer of the sixteen products located on the three-track conveyor 15 and the individual track conveyors 16, 17 to the four-track conveying section 19 has already begun.

Figure 13:
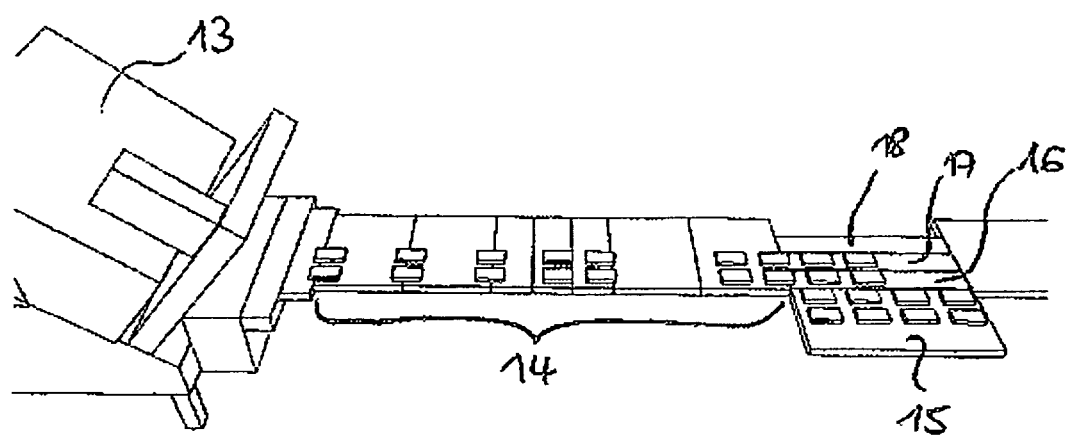

While the last-named transfer takes place, a total of eight products are again already being transferred from the conveying section 14 to the three-track conveyor 15 such that, after the delivery of the sixteen products from the three-track conveyor 15 and the single-track conveyors 16, 17, the operating situation in accordance with FIG. 15 is again obtained, starting from which the method in accordance with FIGS. 12 to 14 can run.

The method in accordance with FIGS. 12 to 15 can thus serve to convert a two-track conveying process into a four-track conveying process such that, after this conversion, the method in accordance with the invention in accordance with FIGS. 1 to 11 can take place. Ultimately, the four-track conveying section 19 in accordance with FIG. 15 can therefore correspond to the four-track conveying section 1 in accordance with FIGS. 1 to 11.

The arrangement shown in FIGS. 16 to 22 corresponds to that arrangement already described in connection with FIGS. 12 to 15. The only difference consists of product stacks now being delivered on three tracks from the slicer 13 in accordance with FIGS. 16 to 22.

Figure 16:
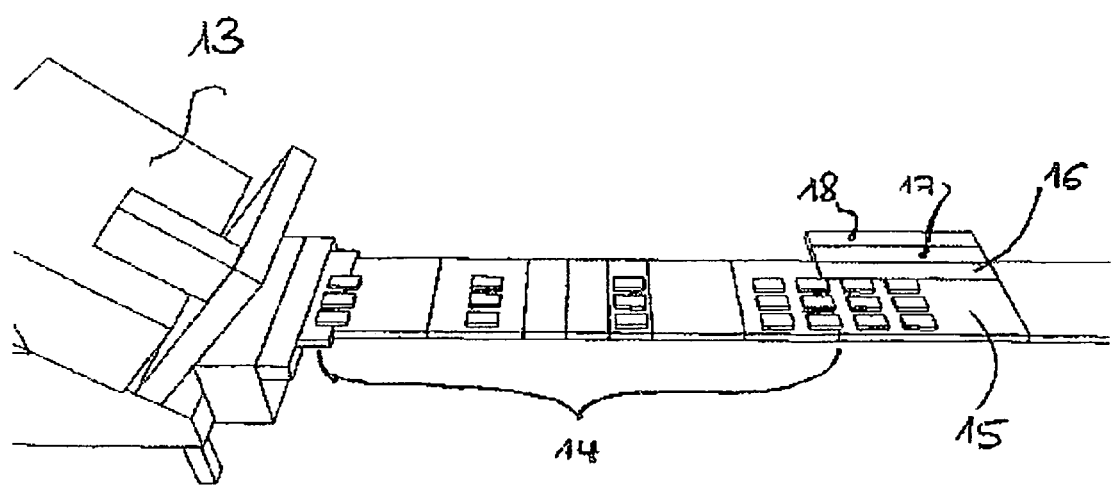
FIGS. 16 to 22 in each case are a schematic oblique view of a region of a four-track conveying segment in different operating positions which, in accordance with a first variant, is suitable to convert a three-track conveying into a four-track conveying.
Figure 17:
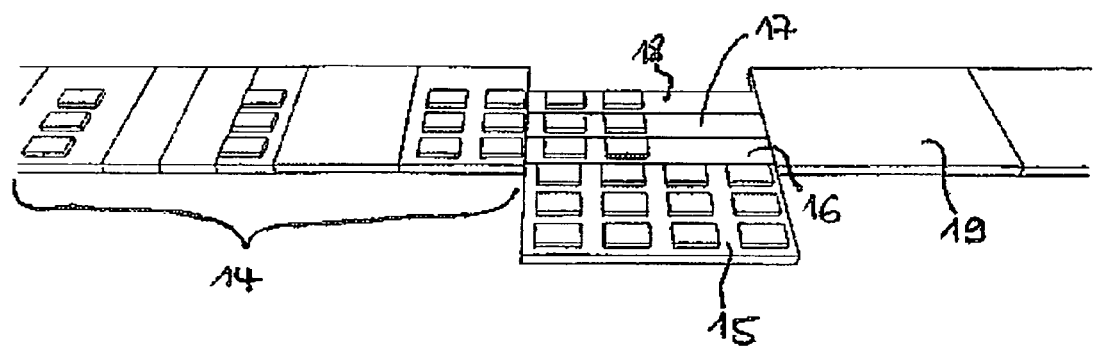

In accordance with FIG. 16, products are now therefore simultaneously transferred on three tracks from the conveying section 14 to the three-track conveyor 15 so that a total of twelve products are located on the three-track conveyor 15 after the end of such a transfer. Subsequent to this transfer, the three-track conveyor 15 is moved together with the single-track conveyors 16 to 18 at right angles to the conveying direction such that, in accordance with FIG. 17, the three individual conveyors 16 to 18 are aligned with the conveying section 14 such that they can in turn simultaneously take over twelve products in three tracks from the conveying section 14. After this taking over, the single-track conveyors 16 to 18 and the three-track conveyor 15 are accordingly completely loaded, with twenty-four products in the present case.

Figure 18:
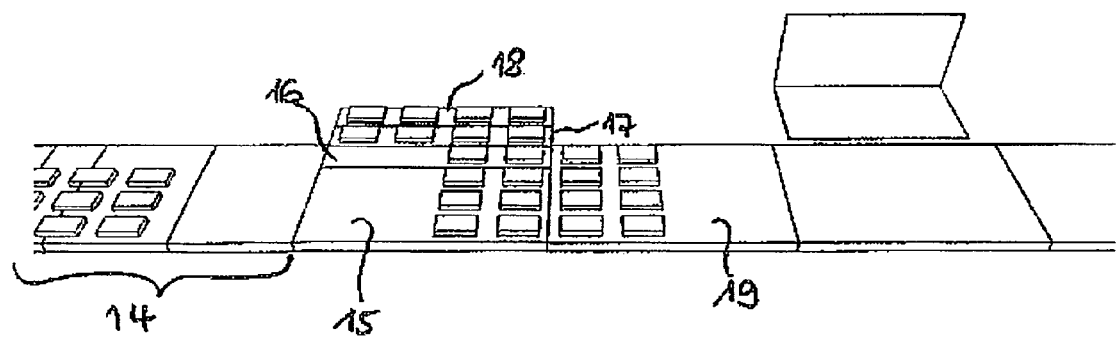
Figure 19:
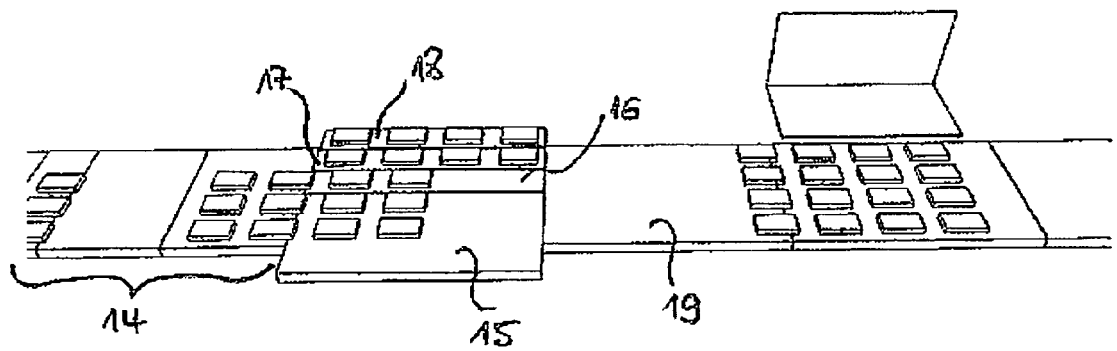

Subsequent hereto, the three-track conveyor 15 and the single-track conveyors 16 to 18 are moved at right angles to the conveying direction such that the three-track conveyor and the single-track conveyor 16 adjacent thereto are aligned with the four-track conveying section 19 such that, in accordance with FIG. 18, sixteen products can be transferred on four tracks from the three-track conveyor 15 and the single-track conveyor 16 to the conveying section 19. In this connection, the three-track conveyor 15 and the single-track conveyor 16 are driven synchronously with one another. The single-track conveyors 17 and 18 stand still.

After delivery of these sixteen products to the four-track conveying section 19, the single-track conveyors 16 to 18 and the three-track conveyor 15 are moved at right angles to the conveying direction such that two-thirds of the three-track conveyor 15 and the single-track conveyors 16 and 17 are aligned with the conveying section 14 such that the three-track conveyor 15 can take over two tracks and the single-track conveyor 16 can take over one track of products. In this manner, in accordance with FIG. 19, twelve products in turn move to the unit of three-track conveyor 15 and single-track conveyor 16.

Figure 20:
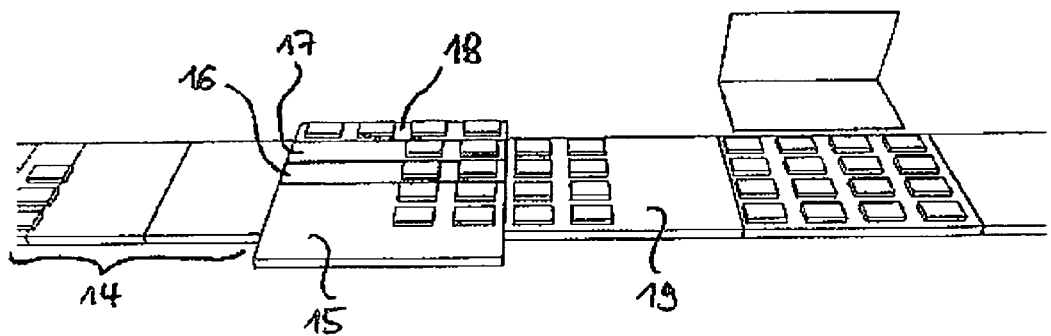
Figure 21:
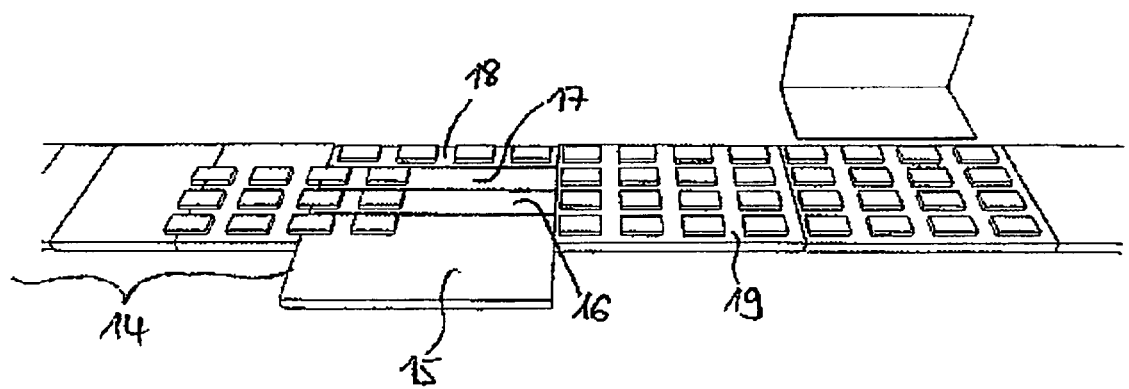

Without a further displacement of the three-track conveyor 15 and the single-track conveyors 16 to 18 at right angles to the conveying direction, sixteen products are subsequently transferred on four tracks from the previously already filled single-track conveyor 17 and the single-track conveyor 16 as well as the three-track conveyor 15 to the four-track conveying section 19. The single-track conveyors 16 and 17 as well as the three-track conveyor 16 are driven synchronously. The single-track conveyor 18 stands still. This method step is illustrated in FIG. 20.

After delivery of these sixteen products to the four-track conveying section 19, only the single-track conveyor 18 is still loaded with products. The single-track conveyors 16 to 18 and the three-track conveyor 15 are subsequently moved in accordance with FIG. 21 at right angles to the conveying direction such that the single-track conveyors 16 and 17 as well as the innermost track of the three-track conveyor 15 are suitable for the receiving of twelve further products delivered on three tracks from the conveying section 14. Subsequent to this transfer, a total of sixteen products are located in a four-track formation on the single-track conveyors 16 to 18 and on the innermost track of the three-track conveyor 15.

Figure 22:
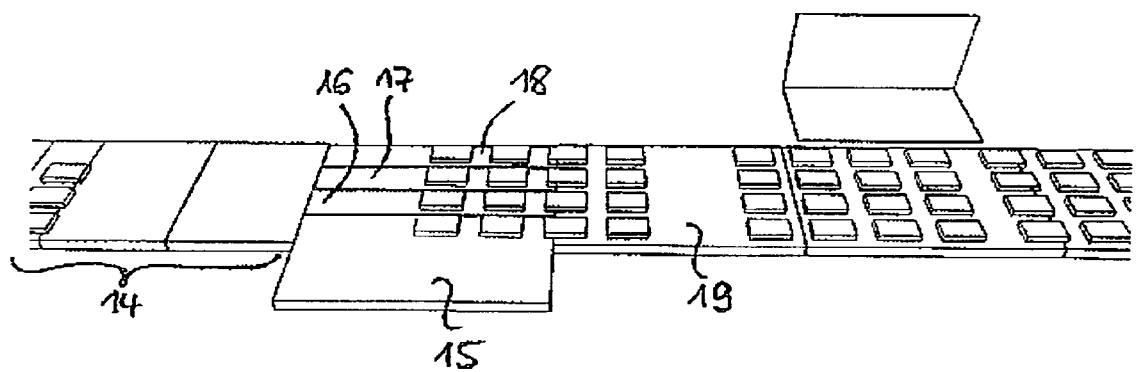

These sixteen products can then be transferred by a simultaneous drive of the three single-track conveyors 16 to 18 and of the three-track conveyor 15 in accordance with FIG. 22 to the four-track conveying section 19. Subsequently, no more products are located on the three-track conveyor 15 and the single-track conveyors 16 to 18 so that the process described starting with FIG. 16 can start from the beginning.

In accordance with FIGS. 16 to 22, it is consequently possible to convert a three-track product flow into a four-track product flow.

An alternative method for the conversion of a three-track conveying process into a four-track conveying process is illustrated in FIGS. 23 to 27.

FIGS. 23 to 27, like FIG. 1, show a four-track conveying section 1 to which an intermediate conveyor 3 is adjacent, with in turn five individual conveyors 4 to 8 being arranged thereafter. A single-track conveying section 9 which is suitable to transport products to a packaging machine 20 then adjoins these five individual conveyors 4 to 8.

Unlike FIG. 1, however, a further intermediate conveyor 3' is provided beside the intermediate conveyor 3. Equally, five further individual conveyors 4' to 8' are located beside the five individual conveyors 4 to 8, with a further single-track conveying section 9' adjacent thereto which is suitable to transport products to a further packaging machine 20'. In this respect, the arrangement in accordance with FIG. 1 is simply doubled from the intermediate conveyor 3, with the two units of intermediate conveyor 3 or 3', individual conveyors 4 to 8 and 4' to 8' respectively and single-track conveying section 9 or 9' functioning in the same way, as was already explained in connection with FIGS. 1 to 11.

Figure 23:
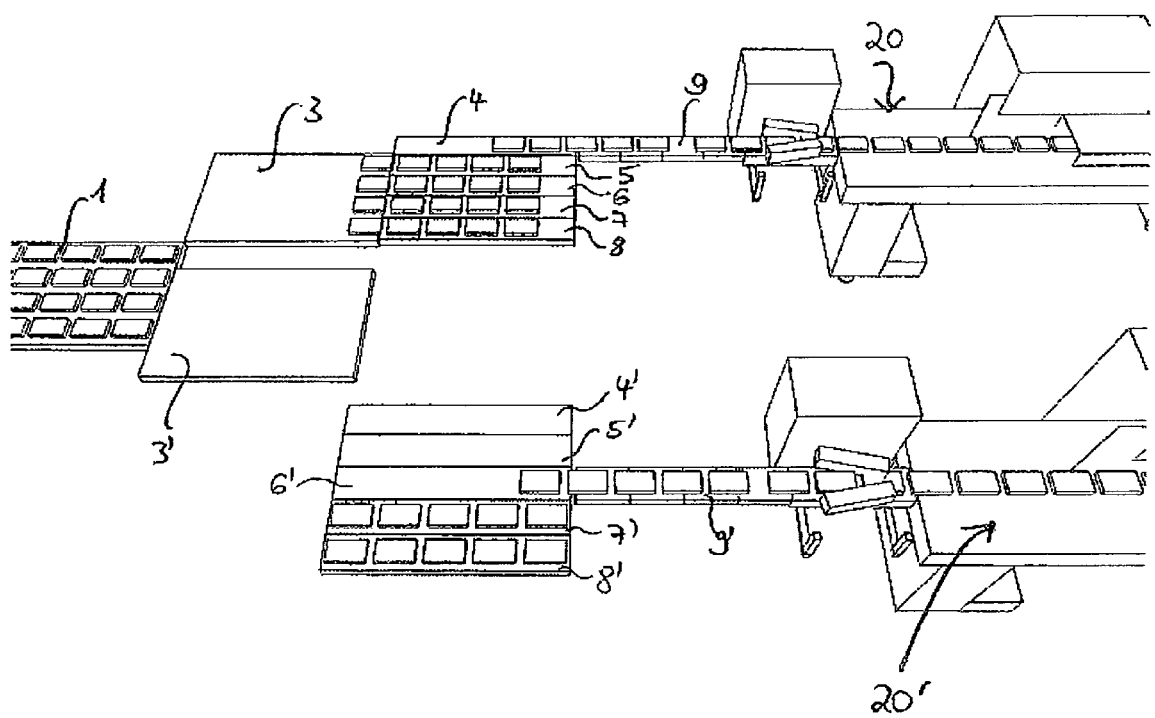
FIGS. 23 to 27 in each case are a schematic oblique view of an end section of a four-track conveying segment in different operating positions having two adjoiningly arranged intermediate conveyors and two single-track conveying sections.
Figure 24:
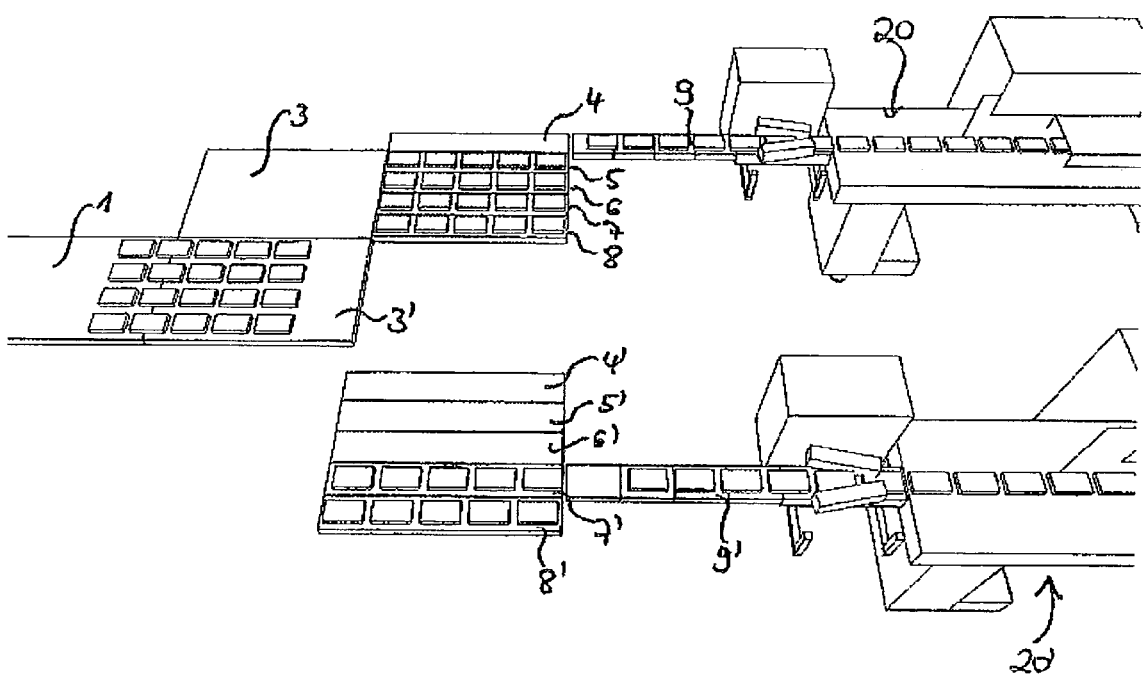

In contrast to FIG. 1, the arrangement in accordance with FIGS. 23 to 27 is, however, in a position to load two packaging machines 20, 20' in parallel, with the following procedure taking place:

In accordance with FIG. 23, products are transferred from the individual conveyors 4' to 8' to the single-track conveying section 9', while simultaneously a transfer takes place of a product matrix from the intermediate conveyor 3 to the individual conveyors 5 to 8. Likewise at the same time, the intermediate conveyor 3' is moved at right angles to the conveying direction such that it is ultimately aligned with the four-track conveying section 1. This position is then reached in accordance with FIG. 24 such that a product matrix can be transferred from the four-track conveying section 1 to the intermediate conveyor 3'. At the same time as this transfer shown in FIG. 24, the delivery furthermore takes place of products from the individual conveyors 4' to 8' to the single-track conveying section 9' as well as the delivery of products from the individual conveyors 4 to 8 to the single-track conveying section 9.

Figure 25:
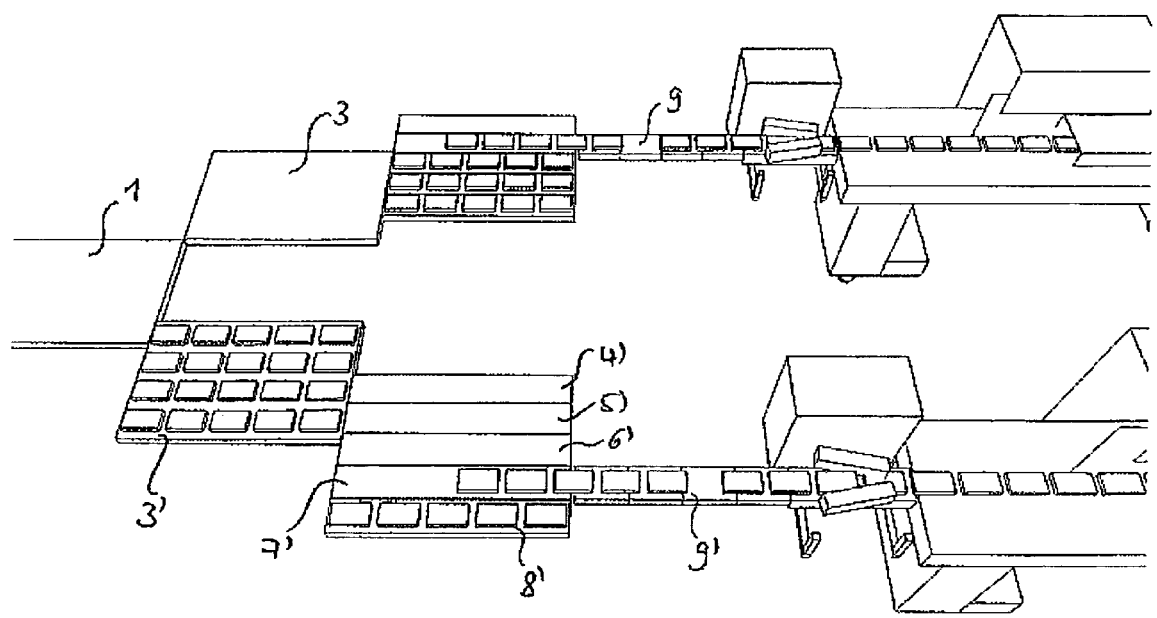
Figure 26:
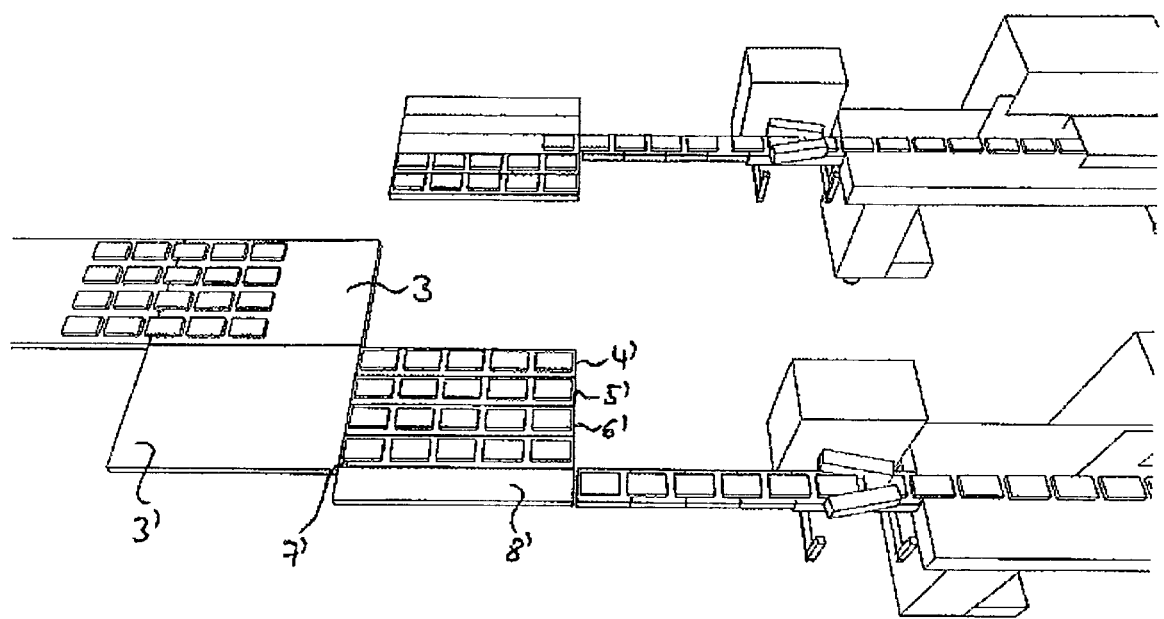
Figure 27:
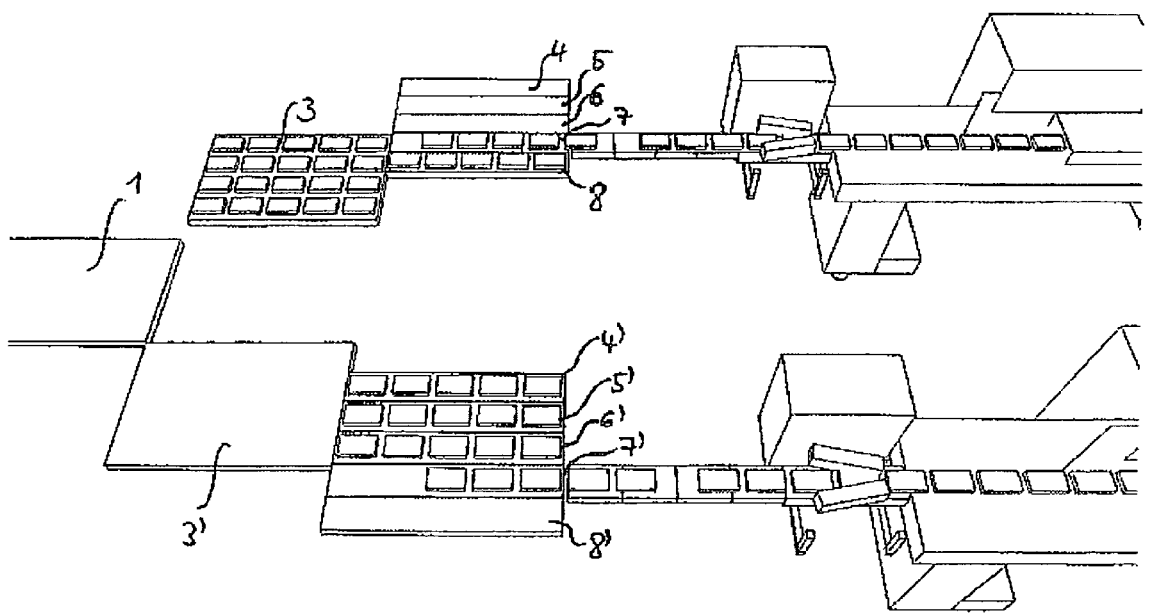
Figure 28:
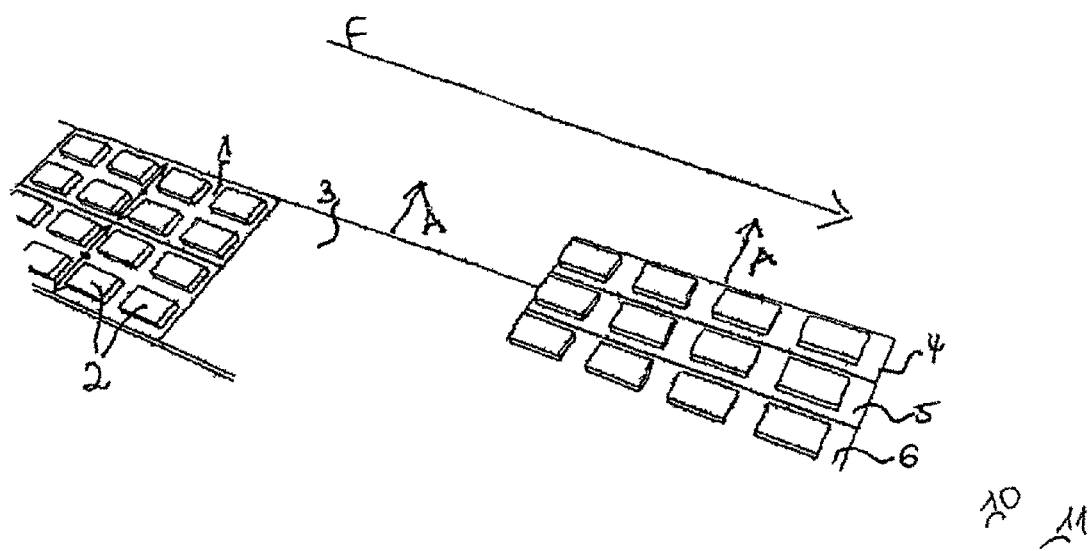
FIG. 28 is a view similar to FIG. 1 and illustrates a single-track conveying station that is fixed in a perpendicular direction to the conveying device.

After the transfer of the product matrix from the four-track conveying section 1 to the intermediate conveyor 3 has been completed, the latter is displaced in the direction of the individual conveyors 4' to 8' together with the products lying on it at right angles to the conveying direction such that a transfer of products can take place to these individual conveyors 4' to 8' from the intermediate conveyor 3'. The named movement of the intermediate conveyor 3' is shown in FIG. 25. Subsequently, the product matrix is then transferred from the intermediate conveyor 3' to the individual conveyors 4' to 7' so that the intermediate conveyor 3' is subsequently empty, as is shown in FIG. 26. Since the intermediate conveyor 3' is still aligned with the individual conveyors 4' to 7' in this position, the other intermediate conveyor 3 can be aligned with the four-track conveying section so that a product matrix can be transferred to this further intermediate conveyor 3 as is likewise illustrated in FIG. 26.

After the intermediate conveyor 3 has been loaded with a product matrix, this intermediate conveyor is in turn moved in the direction of the individual conveyors 4 to 8 such that the products can be transferred to the individual conveyors 5 to 8. Subsequently, the described process starting with FIG. 23 can be repeated as often as desired.

Figure 29:
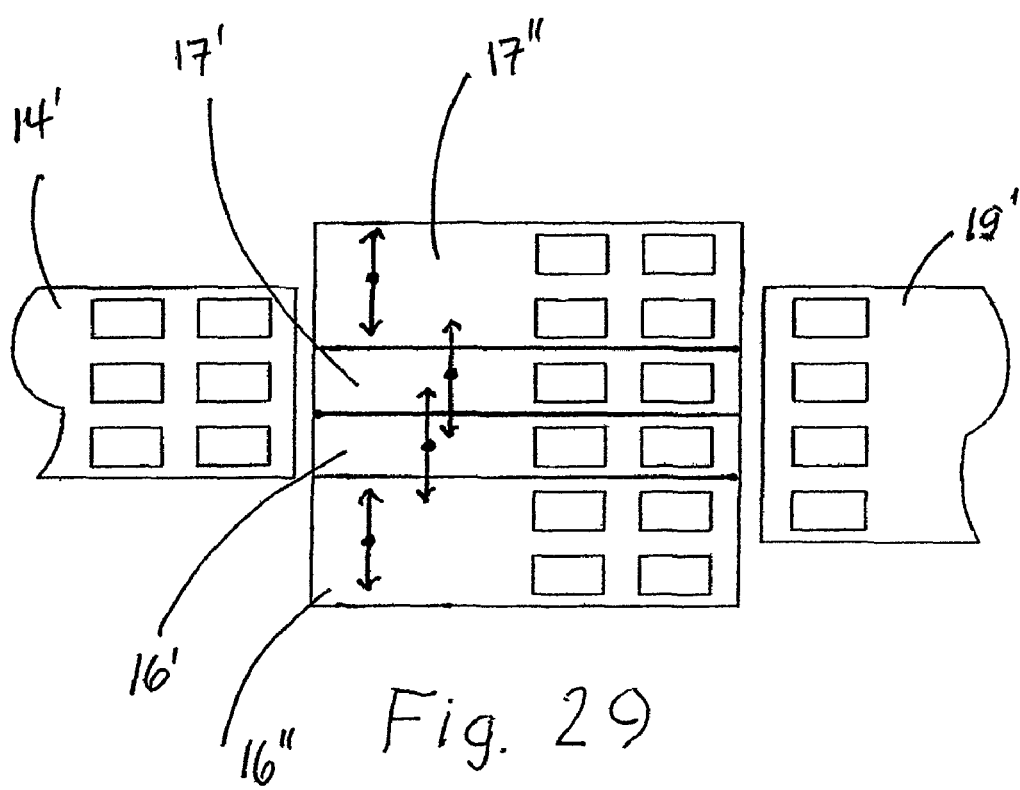
FIG. 29 shows product delivered on a three-track conveying section being transformed to a four-track conveying section.

FIG. 29 is a plan view and illustrates how two single-track conveyors 16', 17' are arranged between two two-track conveyors 16" and 17", with product being delivered on a three-track conveyor 14' and delivered onto four-track conveying section 19'.

Figure 30:
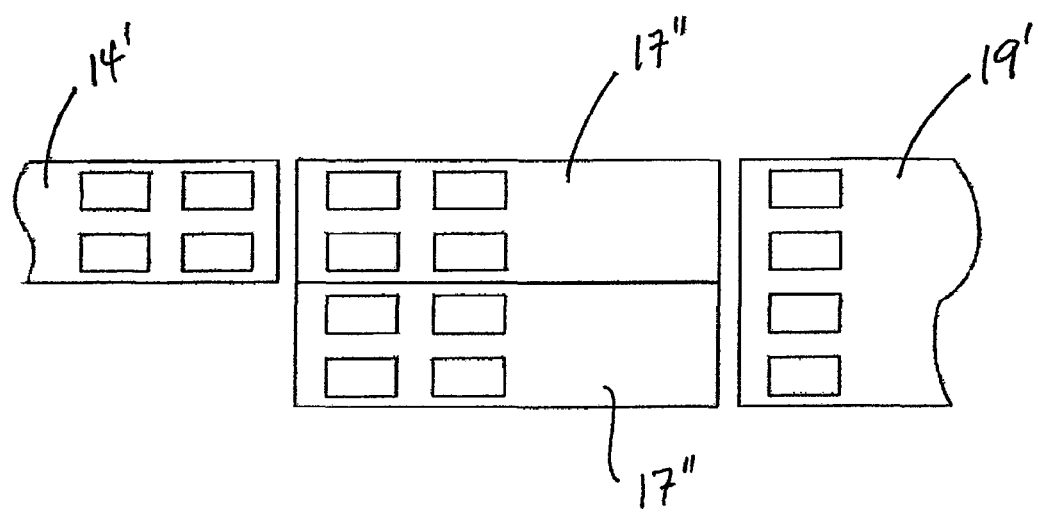
FIG. 30 shows a two-track conveying section loading a four-track conveying section via two, parallel two-track conveyors.

FIG. 30 illustrates the loading of a four-track conveying section 19' with product delivered by a two-track conveying section 14' via two two-track conveyors 17" arranged therebetween.

The invention claimed is:

1. An apparatus for the conveying of separated products having an n-track conveying section and a single-track conveying section, comprising
    at least n+1 individual conveyors extending parallel to one another in a conveying plane that adjoin the end of the n-track conveying section;
    wherein the individual conveyors can be driven independently of one another in the conveying direction;
    wherein the individual conveyors can be moved at right angles to the conveying direction in the conveying plane; and
    wherein n>1 and applies to the n-track conveying section.

2. An apparatus in accordance with claim 1, wherein the n-track conveying section and the single-track conveying section extend in a common conveying plane.

3. An apparatus in accordance with claim 1, wherein each individual conveyor is designed for the receiving of at least m separated products and wherein m>1.

4. An apparatus in accordance with claim 3, wherein the intermediate conveyor is designed for the receiving of n*m separated products.

5. An apparatus according to claim 3 wherein m is between 1 and 10.

6. An apparatus according to claim 3 wherein m=4.

7. An apparatus in accordance with claim 1, wherein all the individual conveyors are movable together at right angles to the conveying direction in the conveyor plane.

8. An apparatus in accordance with claim 1, wherein an n-track intermediate conveyor is arranged between the n+1 parallel individual conveyors and the n-track conveying section and is movable at right angles to the conveying direction in the conveyor plane.

9. An apparatus in accordance with claim 1, including a conveying device, and wherein the single-track conveying section is fixed and cannot be moved at right angles to the conveying device.

10. An apparatus in accordance with claim 1, wherein the single-track conveying section consists of a plurality of mutually adjoining conveying segments which can be driven at conveying speeds deviating from one another.

11. An apparatus in accordance with claim 1, wherein two single-track conveying sections, with which in particular a respective packaging machine is associated, follow the n-track conveying section, with preferably n+1 respective parallel individual conveyors and a respective n-track intermediate conveyor being associated with each single-track conveying section.

12. An apparatus in accordance with claim 1, wherein the n-track conveying section is made as a track four-track conveying section whose start consists of two two-track conveyors which extend parallel to one another in the conveying plane, which can be driven independently of one another in the conveying direction and which are movable at right angles to the conveying direction.

13. An apparatus in accordance with claim 12, wherein both two-track conveyors are movable together at right angles to the conveying direction in the conveying plane.

14. An apparatus in accordance with claim 1, wherein the n-track conveying section is made as a four-track conveying section whose start consists of two two-track conveyors which extend parallel to one another in the conveying plane, which can all be driven independently of one another in the conveying direction and which are movable at right angles to the conveying direction in the conveying plane.

15. An apparatus in accordance with claim 14, including two single-track conveyors located between the two two-track conveyors.

16. An apparatus in accordance with claim 14, wherein the two two-track conveyors and the two single-track conveyors are movable together at right angles to the conveying direction in the conveying plane.

17. An apparatus in accordance with claim 1, wherein the n-track conveying section is made as a four-track conveying section whose start consists of a three-track conveyor extending in the conveying plane and three single-track conveyors which extend parallel thereto in the conveying plane, which can all be driven independently of one another in the conveying direction and which are movable at right angles to the conveying direction in the conveying plane.

18. An apparatus in accordance with claim 17, wherein the three single-track conveyors are arranged only on one side of the three-track conveyor.

19. An apparatus in accordance with claim 17, wherein the three-track conveyor and the three single-track conveyors can be moved together at right angles to the conveying direction in the conveying plane.

20. An apparatus according to claim 1 wherein n is less than 5.

21. An apparatus according to claim 1 wherein n=4.

22. A method for the operation of an apparatus for the conveying of separated products having an n-track conveying section and a single-track conveying section,
wherein
at least n+1 individual conveyors extending parallel to one another in a conveying plane adjoin the end of the n-track conveying section;
the individual conveyors can be driven independently of one another in the conveying direction; and
the individual conveyors can be moved at right angles to the conveying direction in the conveying plane,
wherein n parallel adjacent individual conveyors can be loaded with products simultaneously;
wherein the loaded individual conveyors sequentially transfer the respective products located on them to the single-track conveying section after they have been moved into a transfer position in each case at right angles to the conveying direction; and
wherein finally the products of an outer individual conveyor are transferred, while the other n individual conveyors (respectively) are already again simultaneously being loaded with products.

23. A method in accordance with claim 22, wherein first all the products of one individual conveyor are transferred before the products of a further individual conveyor are transferred.

24. A method in accordance with claim 22, wherein the spacings of sequential products are homogenized by control of the mutually adjoining conveying segments of the single-track conveying section at conveying speeds deviating from one another.

25. A method in accordance with claim 22, wherein a two-track conveying section loads a four-track conveying section via two two-track conveyors extending parallel to one another in the conveying plane.

26. A method in accordance with claim 22, wherein a three-track section loads a four-track conveying section via two two-track conveyors extending parallel to one another in the conveying plane and two single-track conveyors extending parallel thereto in the conveying plane.

27. A method in accordance with claim 22, wherein a three-track conveying section loads a four-track conveying section via a three-track conveyor extending in the conveying plane and three single-track conveyors extending parallel thereto in the conveying plane.

28. An apparatus for the conveying of separated products having an n-track conveying section and a single-track conveying section adjoining it,
comprising
at least n+1 individual conveyors extending parallel to one another in a conveying plane that adjoin the end of the n-track conveying section;
wherein the individual conveyors can be driven independently of one another in the conveying direction;
wherein the individual conveyors can be moved at right angles to the conveying direction in the conveying plane; and
wherein the n-track conveying section is made as a four-track conveying section whose start consists of two two-track conveyors which extend parallel to one another in the conveying plane, which can be driven independently of one another in the conveying direction and which are movable at right angles to the conveying direction.

29. An apparatus according to claim 28, wherein the two-track conveyors are movable in the conveying plane.

30. An apparatus in accordance with claim 28, wherein n>1 and applies to the n-track conveying section.

31. An apparatus for the conveying of separated products having an n-track conveying section and a single-track conveying section adjoining it,
comprising
at least n+1 individual conveyors extending parallel to one another in a conveying plane that adjoin the end of the n-track conveying section;
wherein the individual conveyors can be driven independently of one another in the conveying direction;
wherein the individual conveyors can be moved at right angles to the conveying direction in the conveying plane; and
wherein the n-track conveying section is made as a four-track conveying section whose start consists of a three-track conveyor extending in the conveying plane and three single-track conveyors which extend parallel thereto in the conveying plane, which can all be driven independently of one another in the conveying direction and which are movable at right angles to the conveying direction in the conveying plane.

* * * * *